Figures 1, 2:
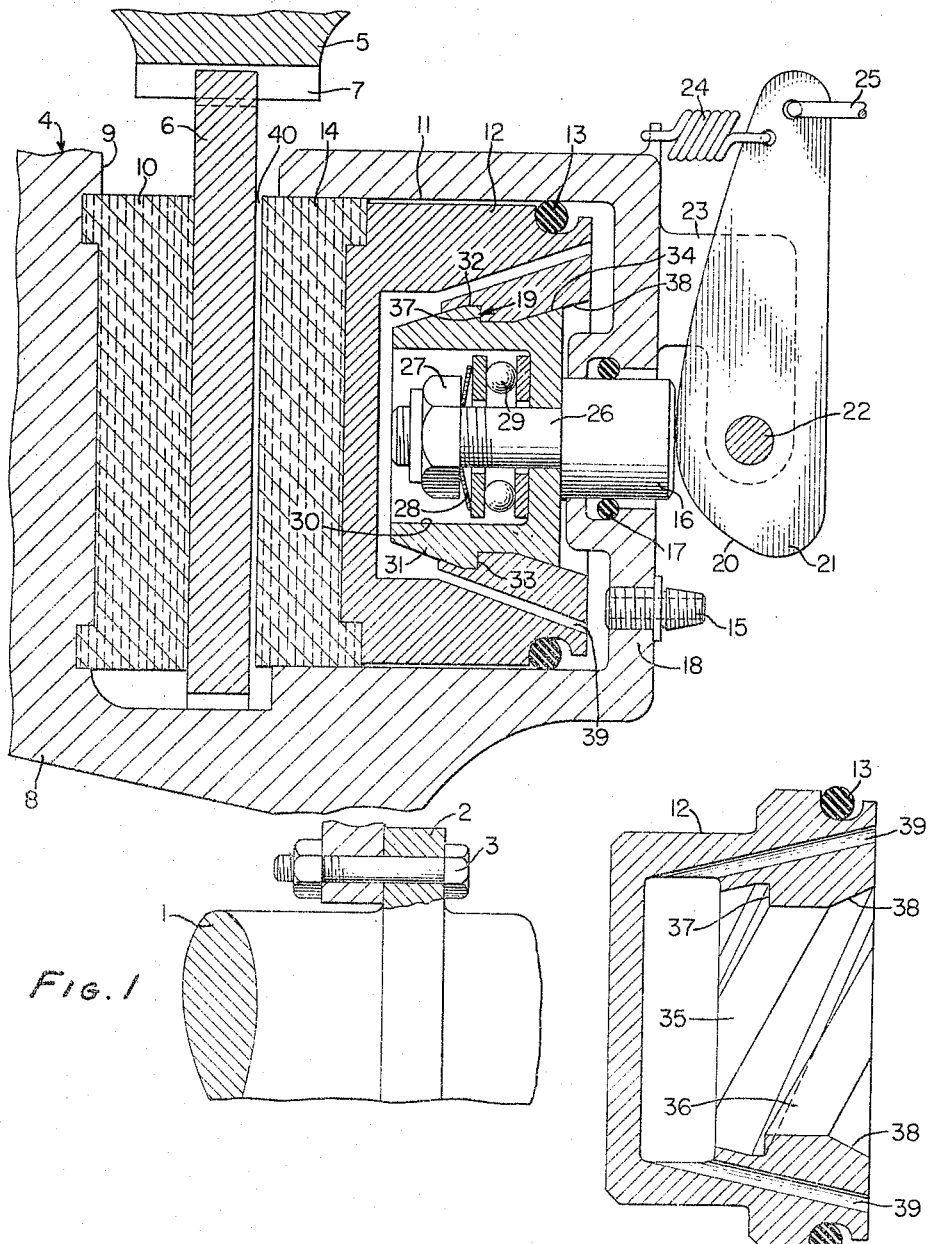

INVENTOR.
THEODORE FRAYER

BY
J B Holden
ATTORNEY

United States Patent Office 3,244,260
Patented Apr. 5, 1966

3,244,260
COMPENSATOR FOR FRICTION MATERIAL WEAR AND HYDRAULIC BRAKE WITH MECHANICAL PARKING BRAKE ATTACHMENT
Theodore Frayer, North Canton, Ohio, assignor to The Goodyear Tire & Rubber Company, Akron, Ohio, a corporation of Ohio
Filed Feb. 20, 1964, Ser. No. 346,322
3 Claims. (Cl. 188—196)

This invention relates to a hydraulic brake with a mechanical parking brake attachment, and, more generally, is concerned with mechanism for automatically compensating for friction material wear in a brake combination.

It is the general object of the invention to provide an improved, simplified, relatively inexpensive hydraulic brake having associated therewith a mechanical parking brake attachment, and with lining or friction material wear in the brake being automatically compensated for.

Another object of the invention is the provision of automatic wear compensating means for a brake wherein the compensating means include threaded parts freely rotatable to compensate for lining wear when an axial force is applied to the threaded parts in one direction, but with the threaded parts locking up and not rotating upon the application of an axial force thereto in the opposite direction.

The foregoing objects of the invention, and other objects which will become apparent as the description proceeds, are achieved by the combination in a brake, of a rotatable member, a stationary member, friction means, means movably mounting the friction means on one member for movement into engagement with the other member to effect a braking action between the members, means for moving the friction means, said last-named means including a connection with the friction means which gradually increases in length as the friction means wear, the connection including two thread connected parts turning freely in one direction upon the application of axial force thereto and locking against rotation upon the application of axial force in the other direction.

The invention also provides the combination in a brake of a rotary member and a stationary member, friction means, a fluid pressure motor mounted on one member and having a piston pressing the friction means against the other member, and mechanical means mounted on said one member and operating on the piston and through the fluid pressure motor to independently press the friction means against the other member, the combination being characterized by means connecting the mechanical means and the piston which lock when the mechanical means are operated, and which reposition themselves periodically when the fluid pressure motor is operated and as wear of the friction means occur.

For a better understanding of the invention reference should be had to the accompanying drawings, wherein:

FIGURE 1 is a vertical longitudinal sectional view of a brake combination incorporating the principles of the invention; and FIGURE 2 is a more detailed view, in cross section, of one of the threaded parts incorporated in the brake combination.

In the drawings, the numeral 1 indicates generally a stationary member, such as a fixed axle, having a torque flange 2 to which is secured by bolts 3 a brake unit indicated as a whole by the numeral 4. Mounted for rotation relative to the stationary member 1 is a rotary member 5, such as a wheel, which rotatably carries with it a brake disc 6. The disc 6 has limited axial movement only with relation to the wheel 5 by virtue of the spline connection 7 between the disc and wheel.

Returning to the brake unit 4, in the form of the invention illustrated, this comprises a C-shaped housing 8 fitting like a saddle around an arcuate portion of the disc 6. Thus, one side or end of the housing 8 comprises an anvil 9 upon which is removably mounted a block of friction material 10 adapted to engage with one side of the disc 6. Opposite the anvil 9 of the housing 8 the housing is formed with a cylindrical bore 11 which slidably receives a piston 12 grooved to receive an O-ring 13 making sealing engagement with the cylindrical bore 11, to thus provide a fluid pressure motor. The piston 12 carries a block of friction material or lining 14 adapted to engage with the other side of the disc 6.

Hydraulic fluid is introduced to the cylindrical bore 11 to the right of, i.e., behind the piston 12 through a fitting 15 to move the piston 12 to the left to apply the brake. Upon brake application the pressure of the friction means 10 against one side of the disc 6 and the pressure of the friction means 14 against the other side of the disc is equalized by the disc 6 adjusting itself axially on the spline connections 7, in a manner which will be understood.

A mechanical parking brake attachment is shown incorporated with the hydraulic brake previously described, and this is achieved by slidably mounting a pin 16 axially through the back side or end 18 of the fluid pressure motor formed by the piston 12 and the cylindrical bore 11. The pin 16 is sealed in relation to the end 18 of the fluid pressure motor by means of an O-ring or other seal 17. A wear compensating connection indicated as a whole by the numeral 19 is provided between the pin 16 and the piston 12, this connection being hereinafter described in detail. The outer end of the pin 16 is engaged by the cam surface 20 of a lever 21 pivotally mounted on a pin 22 carried by a forked bracket 23 on the end 18 of the fluid pressure motor. The lever 21 is urged to an inoperative position as by a coiled spring 24 and is adapted to be moved to the right by means of a cable adapted, for example, to be connected to an emergency brake lever (not shown).

In the operation of the combination as a parking brake a pull on the cable 25 swings the lever 21 through an arc to the right against the tension of spring 24 to move the camming surface 20 against the outer end of the pin 16 to move the pin inwardly of the fluid pressure motor. The inward movement of the pin 16 operates through the connection 19 to move the piston 12 to the left to apply the friction means 14 against one side of the disc 6 and to press the disc 6 against the friction means 10 carried on the anvil 9 of the brake housing 8.

Returning now to the connection 19, this operates as a mechanism for compensating for the wear of the friction means 10 and 14. As friction or lining wear occurs the connection 19 gradually elongates in an axial direction so that there is no loss of pedal stroke on the brake pedal actuating the piston 12, and without any loss of emergency brake lever stroke actuating the lever 21.

More particularly, the connection or mechanism 19 includes a stud 26 on the pin 16 threaded at its end to receive an adjusting nut 27 which engages through a conical spring washer 28 with one end of an anti-friction ball thrust bearing 29 which in turn engages with the bottom of a recess 30 in a nut 31 having an external thread 32 thereon. The right hand end of the nut 31 engages with the end of the pin 16 upon movement of the pin to the left. The thread 32 on the nut 31 has a square shoulder 33 at one side and a tapered shoulder 34 at the other side. Usually the thread 32 is a double thread, 180° apart, and the thread has a relatively sharp pitch, for example, a pitch greater than at least ½ of the diameter of the nut, and usually about one diameter of the nut.

Cooperating with the external thread 32 on the nut 31 is an internal thread 35, or more specifically a double thread, on the inside of the piston 12. Having reference to FIGURE 2, the second thread is indicated by the numeral 36. Each thread 35 and 36 has a square shoulder 37 at one side and a tapered shoulder 38 at the other. Passageways 39 are provided in the skirt of the piston 12 to allow the passage of fluid to and from a position directly behind the head of the piston, although it will be evident that the fluid for operating the piston entirely surrounds the connection 19 and fills the space to the right of the piston 12.

In operation of the connection 19 of the brake combination shown, and with the parts in the position illustrated, the application of fluid under pressure to the right hand side of the piston 12 results in movement of the piston 12 to the left to close the clearance 40 between the friction material 14 and the disc 6, this clearance 40 normally being distributed about equally on both sides of the disc 6. As the piston 12 moves to the left the spring 28 on the stud 26 of pin 16 yields with a "lost motion" action to allow the nut 31 to be moved axially of the pin and to be carried with the piston 12 by the amount that the spring 28 yields. Normally the spring 28 yields a distance slightly greater than that of the clearance 40 so that the brake can be operated without any relative rotation occurring between any parts in the connection 19. However, as lining or friction wear begins to occur in the means 10 and 14 in order for the brake to be fully applied a greater movement of the piston 12 to the left is required than is provided by the "lost motion" or yielding of the spring 28. Now as the piston 12 moves farther to the left the relatively square shoulders 37 of the threads on the piston engage the relatively square shoulders 33 on the threads 32 on the nut 31, and this force on the nut 31 acting through the anti-friction bearing 29 attempts to move the pin 16 to the left. However, since the hydraulic pressure forces pin 16 to the right and because of the relatively sharp pitch of the thread connection between the piston 12 and the nut 31, the nut 31 rotates on the anti-friction bearing 29.

It can be said that the engagement of the substantially square shoulders 37 and 33 of the threads is at an angle beyond the angle of repose between these thread surfaces and the axial forces cause the nut 31 to rotate by an amount to compensate for the additional travel required of the piston 12 to overcome the wear of the friction material. Now upon the release of the hydraulic pressure on the piston 12, the piston 12 moves to the right to reestablish the clearance 40 on one or both sides of the brake disc 6, this movement being sometimes aided by a return spring (not shown), by unevenness or slightly out of flatness of the disc 6, and aided by the conical spring 28. This repositions the right hand end of the nut 31 against the left hand end of the pin 16 and leaves the parts in position for another brake application, but with the wear of the friction means in the brake having been compensated for. The full release of the brake pedal allows additional hydraulic fluid from the master cylinder (not shown) in the brake system to flow into the brake operating cylinder (not shown) energized by the foot pedal, and the result is that there is no loss in stroke of the brake foot pedal. The connection 19 has acted as a wear compensating mechanism, and it would act in this capacity even though the pin 16 were rigidly fastened in the end 18 of the fluid pressure motor, and there was no mechanical parking brake incorporated in the combination.

Upon operation of the mechanical parking brake, a pull on the cable 25 will swing the lever 21 to the right to move the pin 16 to the left in FIGURE 1 which brings the tapered surfaces 34 and 38 on the threads of the nut 31 and piston 12 into engagement with each other, these tapered surfaces locking so that there is no relative rotation between the nut and the piston as the pin 16 continues to move to the left under the actuation of the lever 21, this movement continuing to apply the friction means 10 and 14 against opposite sides of the brake disc 6. The engagement of the right hand end of the nut 31 with the end of the pin 16 further holds the nut against rotation and directly transmits the force of the pin 16 through the connection 19 and against the piston 12.

In operation of the mechanical parking brake attachment as wear of the friction means 10 and 14 occurs the repositioning of the nut 31 in the piston 12, i.e. the lengthening of the connection 19, as previously described, means that the same operative relation can be retained at all times between the pin 16 and the cam surface 20 of the lever 21, and a full operating stroke on the emergency brake lever is retained regardless of any lining wear which may occur.

Returning to the angle of repose between the substantially square shoulders 37 and 33 of the cooperating threads in the connection 19, this angle, if at or near the angle of repose, would be about 13° or less, when the threads are steel on the nut 31 and aluminum on the piston 12 and these threads are operating in the hydraulic fluid. However, this figure will depend upon surface hardness and finish of the engaging parts and should be determined by test. In order to insure the relative rotation of the nut 31 and the piston 12 upon the application of axial force in one direction thereto the pitch angle of the threads is usually made some 10° to 20° greater than the angle of repose.

The angle of the tapered surfaces 34 and 38 on the threads of the nut 31 and piston 12 effectively multiplies the axial force to create a high normal force and thus high frictional forces in the non-slip mode of operation. In this non-slip direction the frictional forces are also augmented by the friction between pin 16 and nut 31.

It will be recognized that the invention provides wear compensating means for substantially any type of brake, whether hydraulic or mechanical, and this part of the invention can be used alone with either of these types of brakes. Additionally, the invention provides an improved combination of a hydraulic brake and a mechanical parking brake attachment incorporating wear compensating means.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. The combination in a brake of a rotary member and a stationary member, friction means, a fluid pressure motor mounted on one member and having a piston pressing the friction means against the other member, a pin extending axially and slidably but in fluid tight relation through the back of the motor, an externally threaded nut rotatably mounted on the pin, an anti-friction bearing and spring taking the thrust on the nut upon movement of the piston away from the nut, a shoulder on the pin taking the thrust on the nut upon movement of the pin towards the piston, an internal thread carried by the piston and threaded on the nut, the nut locking with the piston upon movement of the nut towards the piston, the nut turning on the pin and in the piston upon movement of the piston away from the pin in an amount to substantially bottom the spring, and mechanical means engaging with the end of the pin extending through the back of the motor to press the pin inwardly and operate the brake.

2. The combination in a brake of a rotary member and a stationary member, friction means, a fluid pressure motor mounted on one member and having a piston pressing the friction means against the other member, a pin at the back of the motor, an externally threaded nut rotatably mounted on the pin, an anti-friction bearing and spring taking the thrust on the nut upon movement of the piston away from the nut, an internal thread carried by the piston and threaded on the nut, the nut locking with the piston upon movement of the nut towards the piston, and the nut turning on the pin and in the piston upon movement of the piston away from the pin.

3. Apparatus, according to claim 1, which includes the combination of means for injecting fluid pressure on one end of said pin, said pressure tending to push said pin in a direction opposite to the movement of said piston whereby when said spring is bottomed the externally threaded nut turns rotatably on said integral thread carried by said piston and threaded on said nut.

References Cited by the Examiner

UNITED STATES PATENTS

| | | | |
|---|---|---|---|
| 2,669,327 | 2/1954 | Chamberlain et al. | 188—72 |
| 2,949,173 | 8/1960 | Peras | 188—196 |
| 2,963,116 | 12/1960 | Peras | 188—106 |

FOREIGN PATENTS 757,522  9/1956  Great Britain.

MILTON BUCHLER, *Primary Examiner.*

DUANE A. REGER, *Examiner.*